(12) United States Patent
Chen et al.

(10) Patent No.: US 7,394,569 B2
(45) Date of Patent: Jul. 1, 2008

(54) ERROR-DIFFUSION IMAGE PROCESSING SYSTEM AND METHOD THEREOF

(75) Inventors: Guo-Tai Chen, Taipei (TW); Jie-Chang Luo, Taipei (TW)

(73) Assignee: Primax Electronics Ltd., Taipei (TW)

( * ) Notice: Subject to any disclaimer, the term of this patent is extended or adjusted under 35 U.S.C. 154(b) by 597 days.

(21) Appl. No.: 11/047,701

(22) Filed: Feb. 2, 2005

(65) Prior Publication Data

US 2006/0170971 A1    Aug. 3, 2006

(51) Int. Cl.
*G06K 15/00* (2006.01)
*G06K 9/36* (2006.01)

(52) U.S. Cl. .................................. 358/3.03; 382/232

(58) Field of Classification Search ............... 382/232, 382/3.03
See application file for complete search history.

(56) References Cited

U.S. PATENT DOCUMENTS 6,201,612 B1 *   3/2001   Matsushiro et al. .......... 358/1.9

* cited by examiner

*Primary Examiner*—Jingge Wu
*Assistant Examiner*—Amara Abdi
(74) *Attorney, Agent, or Firm*—Rabin & Berdo P.C.

(57) ABSTRACT

An improved error-diffusion image processing system and the method thereof adopt the block reading mechanism to replace the row reading mechanism employed in the conventional error-diffusion image processing. This can greatly reduce the memory space required for image processing and increase the operational efficiency. The problem of gaps existing in the block reading mechanism is solved by adding a required error sum (BEsum) in a summed pixel range according to specific position conditions of each block.

8 Claims, 9 Drawing Sheets

Gap 600
Gap 600

ERROR-DIFFUSION IMAGE PROCESSING SYSTEM AND METHOD THEREOF

BACKGROUND OF THE INVENTION

1. Field of Invention

The invention relates to an image processing system and the method of the same. In particular, the invention relates to an error-diffusion image processing method that employs block reading to convert a multi-level image to a bi-level image for output and the method thereof.

2. Related Art

The multi-level image generally refers to a digital image created by a digital camera, scanner, or computer software. In a monochrome image, each pixel consists of at least two different levels of gray. In a color image, there are many different color planes. Each pixel consists of at least two different levels in each color plane.

Either monochrome or color images are usually output via a printer or a display device. However, these output devices often describe these multi-level images in a bi-level way. For example, a monochrome image can only be described using black-level and white-level. For a color image, each color plane is described using on-level and off-level. Therefore, before a multi-level image is sent to these output devices for output, it has to be converted into a bi-level image first.

Such a process of converting a multi-level image into a bi-level image is also called halftoning. The error-diffusion image processing is a widely used conventional halftoning technique. However, the conventional error-diffusion image processing is performed by row reading. That is, the operation is not performed until a whole row of image data are read in. Therefore, it takes a lot of memory space to store the image data. The operation efficiency is also lowered because of the frequent access of data in the memory.

Since the cost of memory is not cheap and the memory space available in the output devices is limited, the conventional error-diffusion image processing method for converting multi-level images to bi-level images indeed faces the problems of memory space usage and the operation efficiency. Therefore, it is necessary to provide an improved solution to solve these problems.

SUMMARY OF THE INVENTION

In view of the foregoing, the invention provides an improved error-diffusion image processing system and the method thereof. A primary objective of the invention is to adopt a blocking reading scheme in place of the row reading scheme in the prior art for the purpose of saving memory space and increasing the operational efficiency.

To implement the objective, the primary technique of the invention is to solve the gap problem caused by block reading in the error-diffusion image processing technique. Hence, good image output quality of the multi-level image still remains when converted into a bi-level image.

The improved error-diffusion image processing system includes: (a) an image partition unit; (b) an operation block processing unit; (c) a summed pixel processing unit; (d) an error-diffusion image processing unit; and (e) a storage unit.

The improved error-diffusion image processing method executes the following operational steps via the above-mentioned system: (a) dividing a multi-level image into more than one block, each block having a position condition (i, j) and containing more than one pixel; (b) reading in sequence blocks for processing and determining an operation block range according to the position condition (i, j), thus computing the summed error of the block (BEsum); (c) determining the summed pixel range according to the position condition (i, j) of the block, adding the summed error to the summed pixel range; and (d) executing an error-diffusion calculation for each pixel in the block to determine the bi-level output of each pixel and storing the result, and computing the average error (BE) of the block and storing it.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
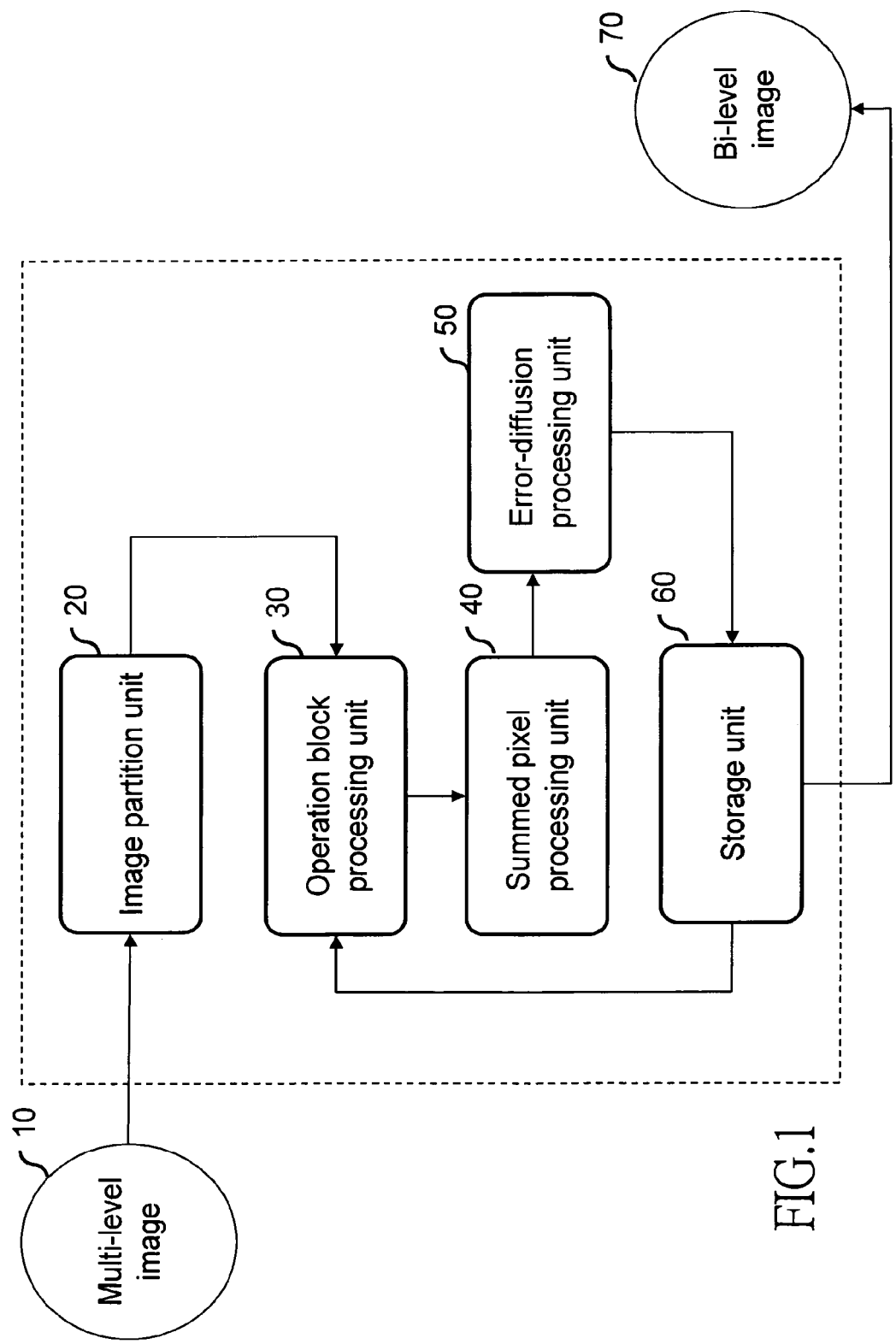
FIG. 1 is a system block diagram of the invention.
Figure 3:
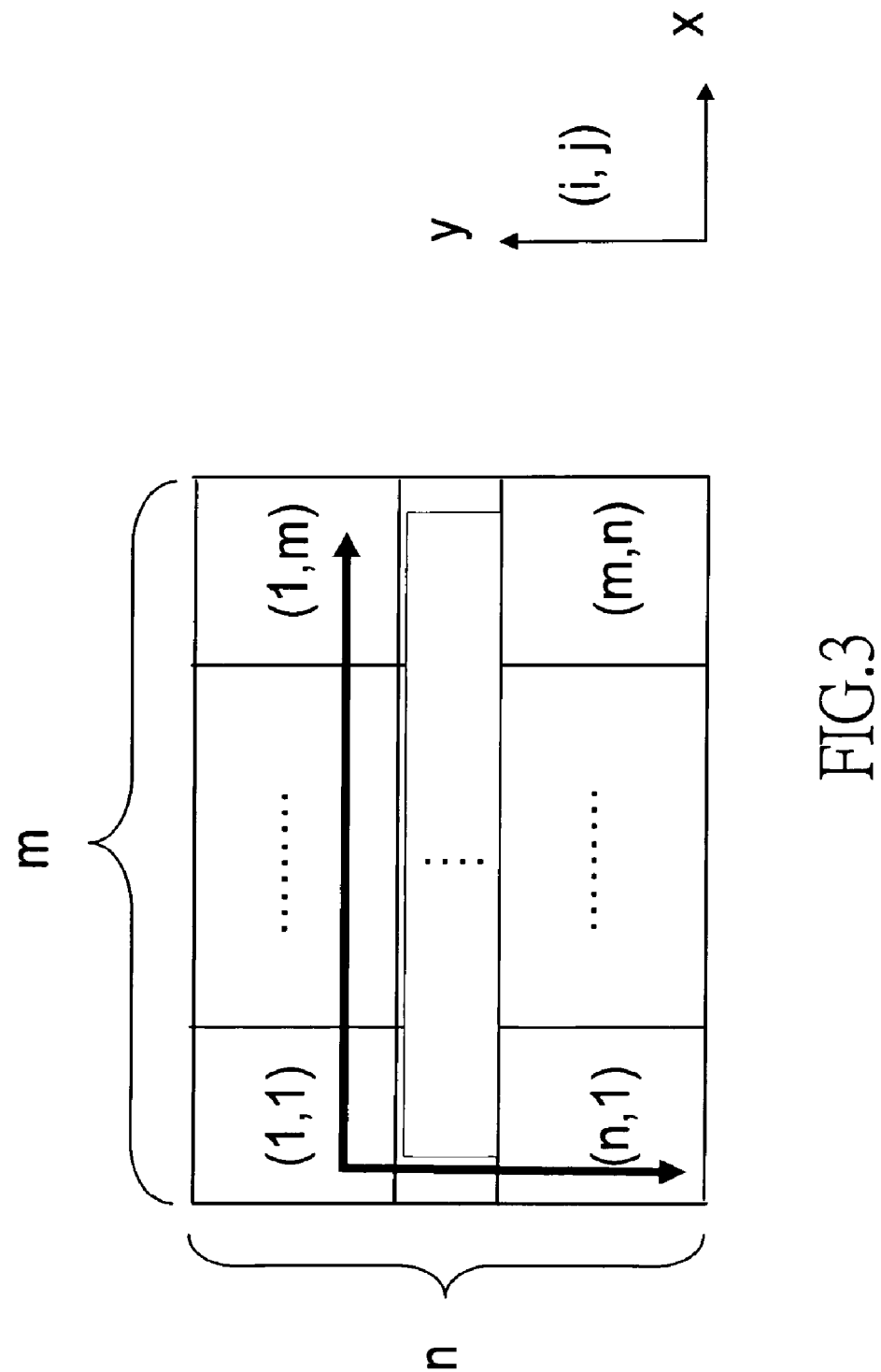
FIG. 3 is a schematic view showing the processing order and position conditions in the invention.

A system block diagram of the invention is shown in FIG. 1. The invention converts a multi-level image 10 from an external input into a bi-level image 70. Main functional blocks include:

(a) an image partition unit 20. It is used to partition the externally input multi-level image, dividing it into many blocks of the same size. Each of the blocks contains many pixels. Each block in the partition is attributed with a fixed position condition (i,j). For example, if the image partition unit 20 divides the multi-level image into m*n blocks, then the corresponding position conditions of the blocks from left to right along the x axis and from up to down along the y axis are (1,1) to (m,n), as shown in FIG. 3.

(b) an operation block processing unit 30. It is used to read in blocks from the image partition unit 20 according to a processing order (i.e. from left to right along the x axis and from up to down along the y axis). The operation block processing unit 30 contains logic rules for determining an operation block range and computing the summed error (BEsum) associated with each block. The operation block range for computing the summed error is determined according to the position conditions (i, j) of each block.

(c) a summed pixel processing unit 40. It is used to determine logic rules for determining a summed pixel range. It adds the summed error (BEsum) obtained by the operation block processing unit 30 into the summed pixel range associated with the block. The method of determining the summed pixel range is also primarily determined by the position condition (i, j) of each block. Once it is determined, the summed error of the block is added to the summed pixel range.

(d) an error-diffusion processing unit 50. It is used to execute an error-diffusion calculation for each pixel in the block to determine the bi-level output associated with pixel and to store the result. Since this part belongs to the scope of the prior art, we do not describe it herein.

Aside from the error-diffusion processing on each pixel of the block, the error-diffusion processing unit 50 has to be able to compute the average error (BE) of the current block and to store it for the summed error calculation needed in subsequent calculations for other blocks.

The average error (BE) is computed as follows:
(the sum of accumulated diffusive errors after the error diffusion calculations of all pixels in the block)/(the sum of all pixels in the block).

The computation rules of the diffusive error are as follows: when the value of a pixel is greater than 128, its diffusive error is (the pixel value-255); and when the value of a pixel is smaller than 128, the pixel value is taken as the diffusive error directly.

(e) a storage unit 60. It is used to store the bi-level output result and the average error (BE) produced by the error-diffusion processing unit 50. In fact, the storage unit 60 can be used to temporarily store the blocks divided by the image partition unit 20. Using this method, the operation block processing unit 30 has to read in the needed block data from the storage unit 60.

Once all the blocks are processed, the converted bi-level image can be output from the storage unit 60.

Figure 2:
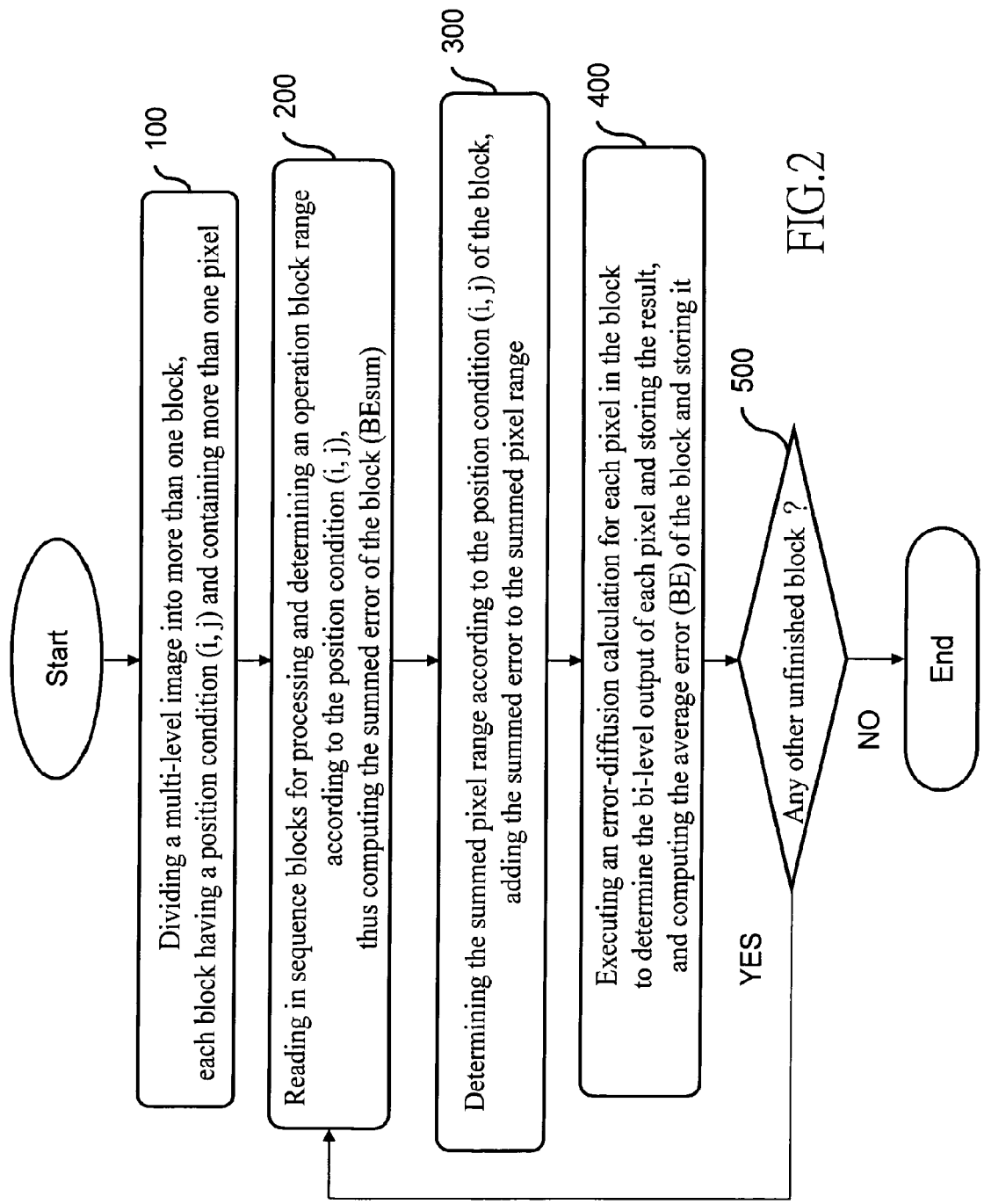
FIG. 2 is a flowchart of the disclosed method.

FIG. 2 shows the actual operational steps in the disclosed method.

(a) The multi-level image is first partitioned into blocks of the same size. Each block is associated with a fixed position condition (i, j), and each block contains many pixels (step 100).

(b) The blocks are read in according to a predetermined sequence for processing. In this case, the position condition (i, j) is used to determined the required operation block range. Afterwards, the determined operation block range is used to compute the summed error (BEsum) of the current block (step 200).

(c) Likewise, the position condition (i, j) of the block is used to determine the summed pixel range that the current block should be adjusted. Afterwards, the summed error associated with the block is added to the summed pixel range (step 300).

(d) Finally, the error-diffusion calculation of each pixel in the current block is carried out to determine the bi-level output of each pixel, and the result is stored (this part belongs to the prior art). The average error (BE) of the current block is computed and stored for computing the summed error in subsequent calculations of other blocks (step 400).

Each block has to go through steps 200 to 400 before the procedure is complete. Once a block completes the processing, the method further determines whether there is any other unfinished block (step 500). If there is, the method returns to step 200 to read in the next block for processing; otherwise, the method has completed the process of converting a multi-level image into a bi-level image. In this case, the complete bi-level image is output.

Figure 4:
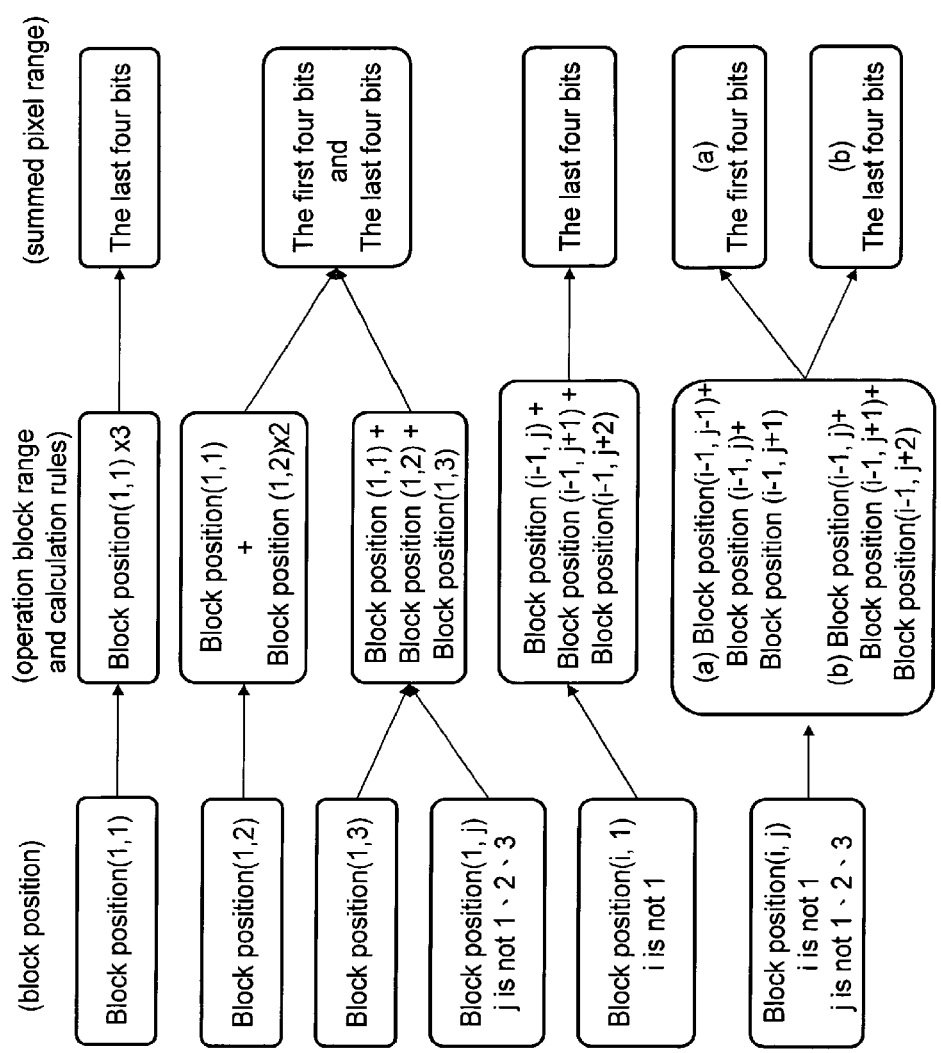
FIG. 4 shows the relation among the logic rules used in the invention.

Various logic rules for the operations in the invention are seen in FIG. 4, which shows one case of the preferred embodiment. It explains the possible variations of the operation block range and the summed pixel range determined from different block position conditions (i, j) and the calculation rules for the summer error.

Figure 5A:
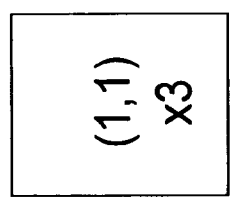
FIGS. 5A to 5F are schematic views of the logic rules used in the invention.
Figure 5B:
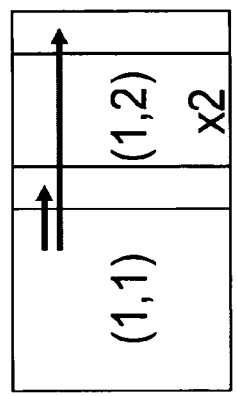
Figure 5C:
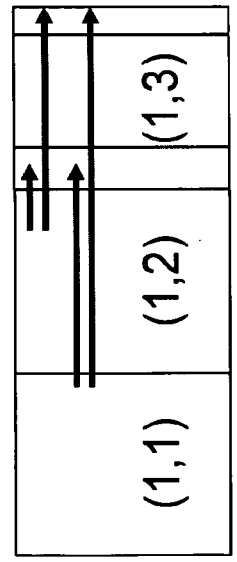
Figure 5D:
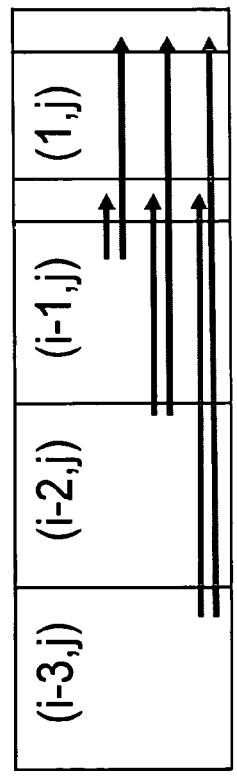

The operational logic rules for position conditions and operation block range are as follows:
When i=1, j=1, the operation block range is the block position (1,1), as shown in FIG. 5A.
When i=1, j=2, the operation block range is the block positions (1,1) and (1,2), as shown in FIG. 5B.
When i=1, j=3, the operation block range is the block positions (1,1), (1,2), and (1,3), as shown in FIG. 5C.
When i=1, j≠1, 2, 3, the operation block range is the block positions (1,1), (1,2), and (1,3), as shown in FIG. 5D.

Figure 5E:
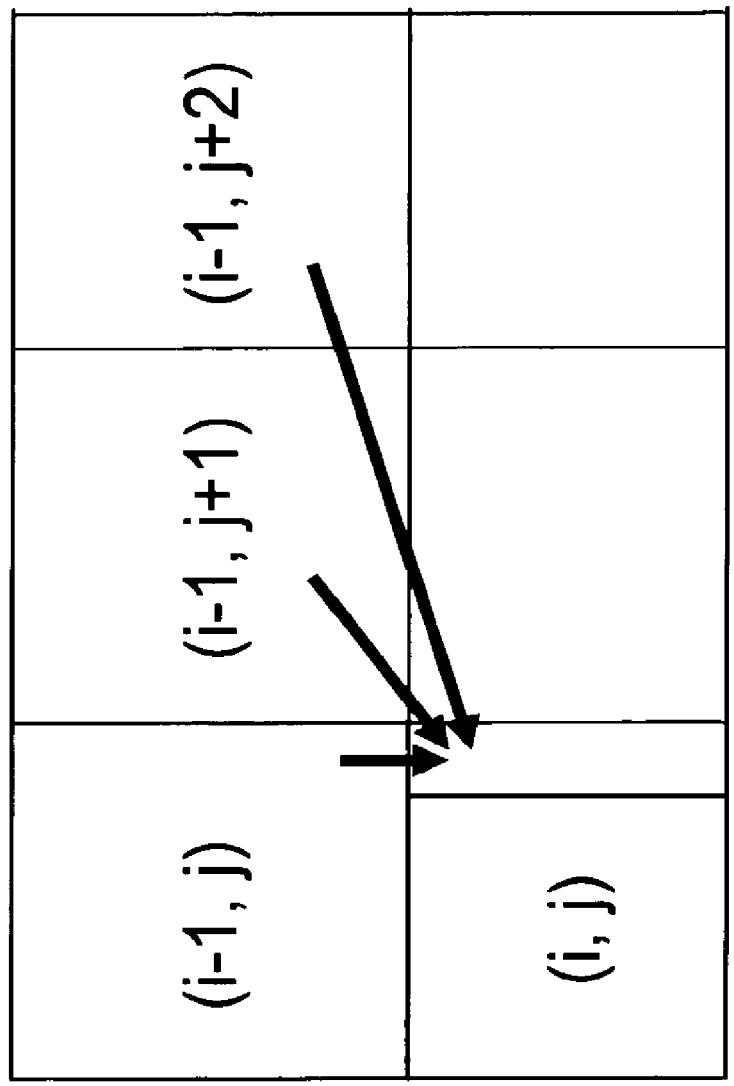

When i≠1, j=1, the operation block range is the block positions (i−1, j), (i−1, j+1), and (i−1, j+2), as shown in FIG. 5E.

The computation rules for the summed error (BEsum) are as follows:
When i=1, j=1, the summed error (BEsum) is BE(1,1)*3, as shown in FIG. 5A.
When i=1, j=2, the summed error (BEsum) is BE(1,1)+BE(1,2)*2, as shown in FIG. 5B.
When i=1, j=3, the summed error (BEsum) is BE(1,1)+BE(1,2)+BE(1,3), as shown in FIG. 5C.
When i=1, j≠1, 2, 3, the summed error (BEsum) is A*BE(1,1)+B*BE(1,2)+C*BE(1,3), as shown in FIG. 5D.
When i≠1, j=1, the summed error (BEsum) is A*BE(i−1, j)+B*BE(i−1, j+1)+C*BE (i−1, j+2), as shown in FIG. 5E.

Here BE is the so-called average error.

The operation logic rules for the position conditions and the summed pixel range are as follows:
When i=1, j=1, the summed pixel range is the last four bits, as shown in FIG. 5A.
When i=1, j=2, the summed pixel range is the first four bits and the last four bits, as shown in FIG. 5B.
When i=1, j=3, the summed pixel range is the first four bits and the last four bits, as shown in FIG. 5C.
When i=1, j≠1, 2, 3, the summed pixel range is the first four bits and the last four bits, as shown in FIG. 5D.
When i≠1, j=1, the summed pixel range is the last four bits, as shown in FIG. 5E.

In the above-mentioned operation logic rules, we provide the processing rules for special blocks belonging to the first column, the first row, and the first three blocks of the first row, etc.

For other blocks with non-special position conditions (when i≠1, j≠1, 2, 3), we have the following processing rules.

Figure 5F:
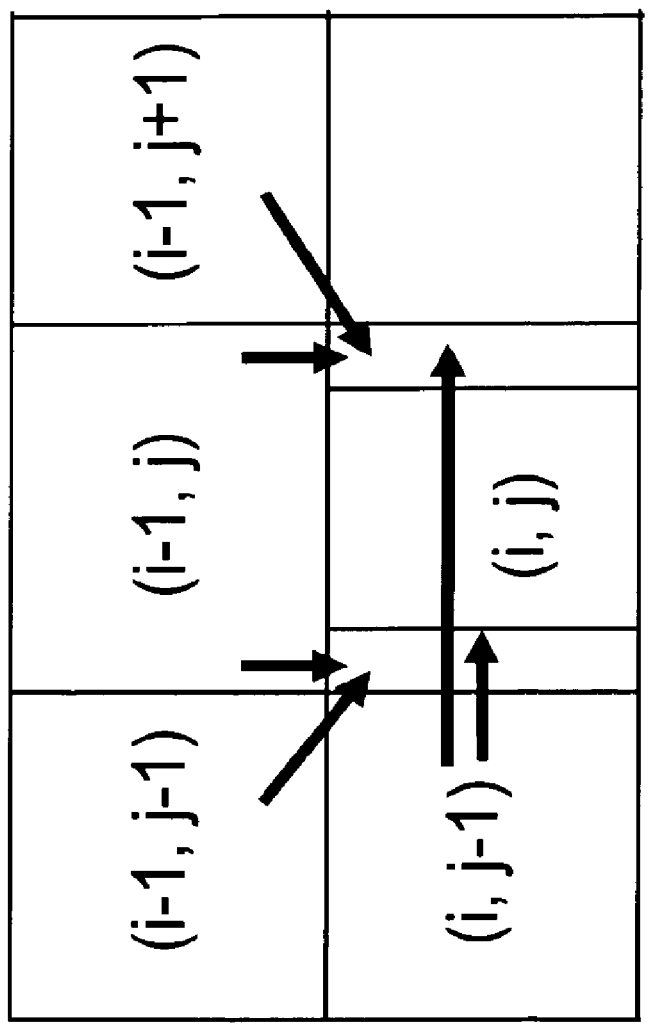

In this case, the operation block range with these position conditions has two parts (FIG. 5F):
(a1) block positions (i−1, j−1), (i−1,j), and (i−1, j+1), and
(b1) block positions (i−1,j), (i−1, j+1), and (i−1, j+2).

Therefore, the summed error (BEsum) is computed according to different operation blocks as follows:
(a2) A*BE(i−1, j−1)+B*BE(i−1, j)+C*BE(i−1, j+1); and
(b2) A*BE(i−1, j)+B*BE(i−1, j+1)+C*BE(i−1, j+2).

Here A, B, and C are weight values (in this embodiment, A is 1/55, B is 1/85, and C is 1/95, but they can be modified appropriately according to practical needs).

The summed pixel range corresponding to the block also contains two parts:
(a3) the first four bits; and
(b3) the last four bits.

One learns from here that for a block with normal position conditions, there are two different operation block ranges, thus generating two different summed errors and different summed pixel ranges. (That is, the operation block range of a1 is used to compute the summed error of a2 and added to the summed pixel range of a3. The operation block range of b1 is used to compute the summed error of b2 and added to the summed pixel range of b3.)

The above-mentioned "the first four bits" refers to the first foru pixels in each row of the block, and "the last four bits" refers to the last four pixels in each row of the block.

The disclosed system and method of operations indeed can replace the row reading method in the conventional error-diffusion image processing with blocking reading in order to save memory space and to increase operation efficiency. Moreover, the invention solves the gap problem existing in the block reading scheme.

Figure 6B:
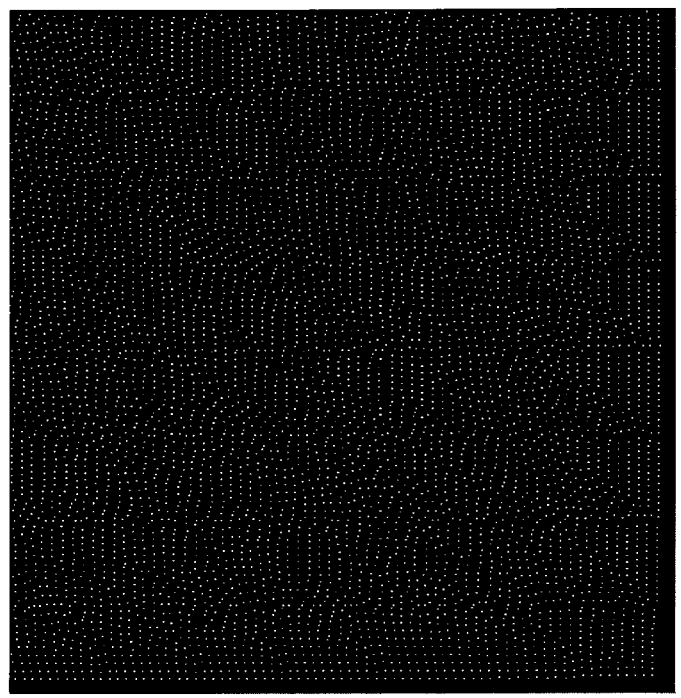
FIGS. 6A and 6B compare results before and after the operation of the invention.
Figure 6A:
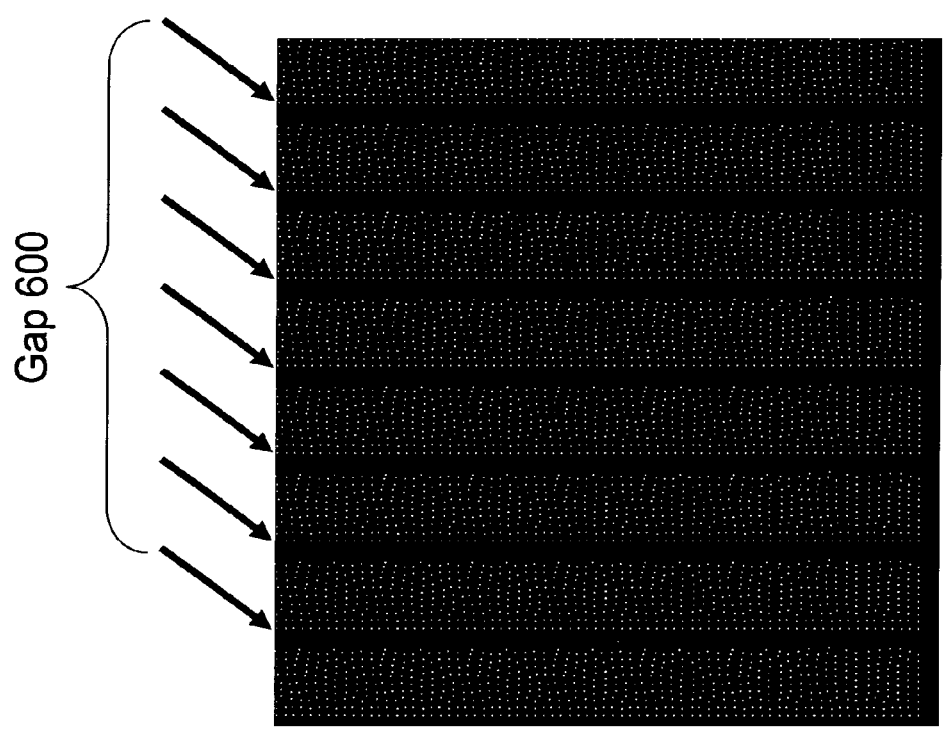
Figure 7B:
FIGS. 7A and 7B compare another results before and after the operation of the invention.
Figure 7A:

Please refer to FIGS. 6A and 7A. It is seen in the drawings that if one simply employs the block processing scheme to perform improved operations on the image, there are many gaps 600 in the output bi-level image, deteriorating the output digital image quality. On the other hand, in FIGS. 6B and 7B, the invention further uses the proposed technique to process the image. Obviously, the gaps 600 disappear and the invention achieves the complete conversion of a multi-level image to a bi-level image.

Certain variations would be apparent to those skilled in the art, which variations are considered within the spirit and scope of the claimed invention.

What is claimed is:

1. An error-diffusion image processing system to convert a multi-level image into a bi-level image, comprising:
    an image partition unit, which divides the multi-level image into a plurality of blocks, each having a position condition (i,j) and a plurality of pixels;
    an operation block processing unit, which reads in a block according to a processing order and determines an operation block range according to the position condition (i,j) to compute a summed error (BEsum) associated with the block;
    a summed pixel processing unit, which determines a summed pixel range according to the position condition (i,j) of the block and adds the summed error to the summed pixel range, wherein the relations between the position condition (i,j) and the logic rules in the operation block range are as follows:
        when i=1, j=1, the operation block range is the block position (1,1);
        when i=1, j=2, the operation block range is the block positions (1,1) and (1,2);
        when i=1, j=3, the operation block range is the block positions (1,1), (1,2), and (1,3);
        when i=1, j≠1, 2, 3, the operation block range is the block positions (1,1), (1,2), and (1,3);
        when i≠1, j=1, the operation block range is the block positions (i−1, j), (i−1, j+1), and (i−1, j+2); and
        when i≠1, j≠1, 2, 3, the operation block range is selected from (a) the block positions (i−1, j−1,), (i−1, j), and (i−1, j+1) and (b) the block positions (i−1, j), (i−1, j+1), and (i−1, j+2);
    an error-diffusion processing unit, which executes the error-diffusion operation for each of the pixels in the block to determine a bi-level output of the pixel for storage and to compute an average error (BE) of the block for storage; and
    a storage unit, which stores the bi-level output and the average error (BE);
    wherein when an unprocessed block remains in the image partition unit, the operations of the operation block processing unit, the summed pixel processing unit, and the error-diffusion processing unit on the blocks are repeated until all of the blocks are processed, and the storage unit outputs the bi-level image.

2. An error-diffusion image processing system to convert a multi-level image into a bi-level image, comprising:
    an image partition unit, which divides the multi-level image into a plurality of blocks, each having a position condition (i,j) and a plurality of pixels;
    an operation block processing unit, which reads in a block according to a processing order and determines an operation block range according to the position condition (i,j) to compute a summed error (BEsum) associated with the block;
    a summed pixel processing unit, which determines a summed pixel range according to the position condition (i,j) of the block and adds the summed error to the summed pixel range, wherein the summed error is computed as follows:
        when i=1, j=1, the summed error (BEsum) is BE(1,1)*3;
        when i=1, j=2, the summed error (BEsum) is BE(1,1)+BE(1,2)*2;
        when i=1, j=3, the summed error (BEsum) is BE(1,1)+BE(1,2)+BE(1,3);
        when i=1, j≠1, 2, 3, the summed error (BEsum) is A*BE(1,1)+B* BE(1,2)+C*BE(1,3);
        when i≠1, j=1, the summed error (BEsum) is A*BE(i−1, j)+B* BE(i−1, j+1)+C*BE(i−1, j+2); and
        when i≠1, j≠1, 2, 3, the summed error (BEsum) is selected from (a) A*BE(i−1, j−1)+B*BE(i−1, j)+C*BE(i−1, j+1) and (b)A*BE(i−1, j)+B*BE(i−1, j+1)+C*BE(i−1, j+2);
    where A, B, and C are weights;
    an error-diffusion processing unit, which executes the error-diffusion operation for each of the pixels in the block to determine a bi-level output of the pixel for storage and to compute an average error (BE) of the block for storage; and
    a storage unit, which stores the bi-level output and the average error (BE),
    wherein when an unprocessed block remains in the image partition unit, the operations of the operation block processing unit, the summed pixel processing unit, and the error-diffusion processing unit on the blocks are repeated until all of the blocks are processed, and the storage unit outputs the bi-level image.

3. The improved error-diffusion image processing system of claim 2, wherein A is 1/55, B is 1/85, and C is 1/95.

4. An error-diffusion image processing system to convert a multi-level image into a bi-level image, comprising:
    an image partition unit, which divides the multi-level image into a plurality of blocks, each having a position condition (i,j) and a plurality of pixels;
    an operation block processing unit, which reads in a block according to a processing order and determines an operation block range according to the position condition (i,j) to compute a summed error (BEsum) associated with the block;
    a summed pixel processing unit, which determines a summed pixel range according to the position condition (i,j) of the block and adds the summed error to the summed pixel range, wherein the relations between the position condition and the logic rules of the summed pixel range are as follows:
        when i=1, j=1, the summed pixel range is the last four bits;
        when i=1, j=2, the summed pixel range is the first four bits and the last four bits;
        when i=1, j=3, the summed pixel range is the first four bits and the last four bits;
        when i=1, j≠1, 2, 3, the summed pixel range is the first four bits and the last four bits;
        when i≠1, j=1, the summed pixel range is the last four bits; and
        when i≠1, j≠1, 2, 3, the summed pixel range is selected from (a) the first four bits and (b) the last four bits;
    an error-diffusion processing unit, which executes the error-diffusion operation for each of the pixels in the block to determine a bi-level output of the pixel for storage and to compute an average error (BE) of the block for storage; and a storage unit, which stores the bi-level output and the average error (BE), wherein when an unprocessed block remains in the image partition unit, the operations of the operation block processing unit, the summed pixel processing unit, and the error-diffusion processing unit on the blocks are repeated until all of the blocks are processed, and the storage unit outputs the bi-level image.

5. An error-diffusion image processing method to convert a multi-level image into a bi-level image, comprising the steps of:
   (a) dividing a multi-level image into more than one block, each block having a position condition (i,j) and containing more than one pixel;
   (b) reading in sequence blocks for processing and determining an operation block range according to the position condition (i,j), thus computing the summed error of the block (BEsum), wherein the relations between the position condition (i,j) and the logic rules in the operation block range are as follows:
      when $i=1$, $j=1$, the operation block range is the block position (1,1);
      when $i=1$, $j=2$, the operation block range is the block positions (1,1) and (1,2);
      when $i=1$, $j=3$, the operation block range is the block positions (1,1), (1,2), and (1,3);
      when $i=1$, $j\neq 1, 2, 3$, the operation block range is the block positions (1,1), (1,2), and (1,3);
      when $i\neq 1$, $j=1$, the operation block range is the block positions (i−1, j), (i−1, j+1), and (i−1, j+2); and
      when $i\neq 1$, $j\neq 1, 2, 3$, the operation block range is selected from (a) the block positions (i−1, j−1), (i−1, j), and (i−1, j+1) and (b) the block positions (i−1, j), (i−1, j+1), and (i−1, j+2);
   (c) determining the summed pixel range according to the position condition (i,j) of the block, adding the summed error to the summed pixel range; and
   (d) executing an error-diffusion calculation for each pixel in the block to determine the bi-level output of each pixel and storing the result, and computing the average error (BE) of the block and storing it,
      wherein steps (b) and (c) are repeated until there is no unprocessed block in step (a), and the average error (BE) of the block is computed and stored.

6. An error-diffusion image processing method to convert a multi-level image into a bi-level image, comprising the steps of:
   (a) dividing a multi-level image into more than one block, each block having a position condition (i,j) and containing more than one pixel;
   (b) reading in sequence blocks for processing and determining an operation block range according to the position condition (i,j), thus computing the summed error of the block (BEsum), wherein the summed error is computed as follows:
      when $i=1$, $j=1$, the summed error (BEsum) is BE(1,1)*3;
      when $i=1$, $j=2$, the summed error (BEsum) is BE(1,1)+BE(1,2)*2;
      when $i=1$, $j=3$, the summed error (BEsum) is BE(1,1)+BE(1,2)+BE(1,3);
      when $i=1$, $j\neq 1, 2, 3$, the summed error (BEsum) is A*BE(1,1)+B*BE(1,2)+C*BE(1,3);
      when $i\neq 1$, $j=1$, the summed error (BEsum) is A*BE(i−1, j)+B*BE(i−1, j+1)+C*BE(i−1, j+2); and
      when $i\neq 1$, $j\neq 1, 2, 3$, the summed error (BEsum) is selected from (a) A*BE(i−1, j−1)+B*BE(i−1, j)+C*BE(i−1, j+1) and (b) A*BE(i−1, j)+B*BE(i−1, j+1)+C*BE(i−1, j+2);
      where A, B, and C are weights;
   (c) determining the summed pixel range according to the position condition (i,j) of the block, adding the summed error to the summed pixel range; and
   (d) executing an error-diffusion calculation for each pixel in the block to determine the bi-level output of each pixel and storing the result, and computing the average error (BE) of the block and storing it.

7. The improved error-diffusion image processing method of claim 6, wherein A is 1/55, B is 1/85, and C is 1/95.

8. An error-diffusion image processing method to convert a multi-level image into a bi-level image, comprising the steps of:
   (a) dividing a multi-level image into more than one block, each block having a position condition (i,j) and containing more than one pixel;
   (b) reading in sequence blocks for processing and determining an operation block range according to the position condition (i,j), thus computing the summed error of the block (BEsum);
   (c) determining the summed pixel range according to the position condition (i,j) of the block, adding the summed error to the summed pixel range wherein the relations between the position condition and the logic rules of the summed pixel range are as follows:
      when $i=1$, $j=1$, the summed pixel range is the last four bits;
      when $i=1$, $j=2$, the summed pixel range is the first four bits and the last four bits;
      when $i=1$, $j=3$, the summed pixel range is the first four bits and the last four bits;
      when $i=1$, $j\neq 1, 2, 3$, the summed pixel range is the first four bits and the last four bits;
      when $i\neq 1$, $j=1$, the summed pixel range is the last four bits; and
      when $i\neq 1$, $j\neq 1, 2, 3$, the summed pixel range is selected from (a) the first four bits and (b) the last four; and
   (d) executing an error-diffusion calculation for each pixel in the block to determine the bi-level output of each pixel and storing the result, and computing the average error (BE) of the block and storing it.

* * * * *